US010442369B2

(12) United States Patent
Hehir et al.

(10) Patent No.: US 10,442,369 B2
(45) Date of Patent: Oct. 15, 2019

(54) METHOD FOR MANUFACTURING A CAMERA FOR A MOTOR VEHICLE IN DEPENDENCY ON AN INTERFACE DEVICE, CAMERA, AS WELL AS MOTOR VEHICLE

(71) Applicant: Connaught Electronics Ltd., Tuam, County Galway (IE)

(72) Inventors: Colin Patrick Hehir, Tuam (IE); Carol Grimes, Tuam (IE); Daniel Proctor, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 15/758,560

(22) PCT Filed: Sep. 9, 2016

(86) PCT No.: PCT/EP2016/071333
§ 371 (c)(1),
(2) Date: Mar. 8, 2018

(87) PCT Pub. No.: WO2017/042351
PCT Pub. Date: Mar. 16, 2017

(65) Prior Publication Data
US 2018/0251081 A1    Sep. 6, 2018

(30) Foreign Application Priority Data

Sep. 11, 2015 (DE) .................. 10 2015 115 361

(51) Int. Cl.
*B60R 11/04* (2006.01)
*H04N 5/225* (2006.01)
*B60R 11/00* (2006.01)

(52) U.S. Cl.
CPC .......... *B60R 11/04* (2013.01); *H04N 5/2252* (2013.01); *H04N 5/2257* (2013.01); *B60R 2011/004* (2013.01)

(58) Field of Classification Search
CPC . B60R 11/04; B60R 2011/004; H04N 5/2252; H04N 5/2257
See application file for complete search history.

(56) References Cited

U.S. PATENT DOCUMENTS

2008/0231744 A1   9/2008  Khanna et al.
2013/0142504 A1   6/2013  Warren et al.
(Continued)

FOREIGN PATENT DOCUMENTS

DE    102008000823 A1   10/2009
EP        2833489 A2    2/2015
(Continued)

OTHER PUBLICATIONS

International Search Report issued in PCT/EP2016/071333 dated Dec. 19, 2016 (3 pages).
(Continued)

*Primary Examiner* — Gevell V Selby
(74) *Attorney, Agent, or Firm* — Osha Liang LLP

(57) ABSTRACT

The invention relates to a method for manufacturing a camera (4) for a motor vehicle (1), in which an interface device (14) for connecting the camera (4) with a data bus of the motor vehicle (1) is selected from at least two different interface devices (14) and is arranged on a circuit board (13), the circuit board (13) is arranged in an interior space (12) of a front housing (10), a rear housing (15) is manufactured and connected with the front housing (10), wherein the rear housing (15) has a through-opening (16), through which the interface device (15) is passed partly, wherein in manufacture of the rear housing (15) the through-opening (16) is formed in dependency on the selected interface device (14), wherein an outer contour of the rear housing (15) is maintained.

10 Claims, 4 Drawing Sheets

(56) References Cited

U.S. PATENT DOCUMENTS

Figure 1:
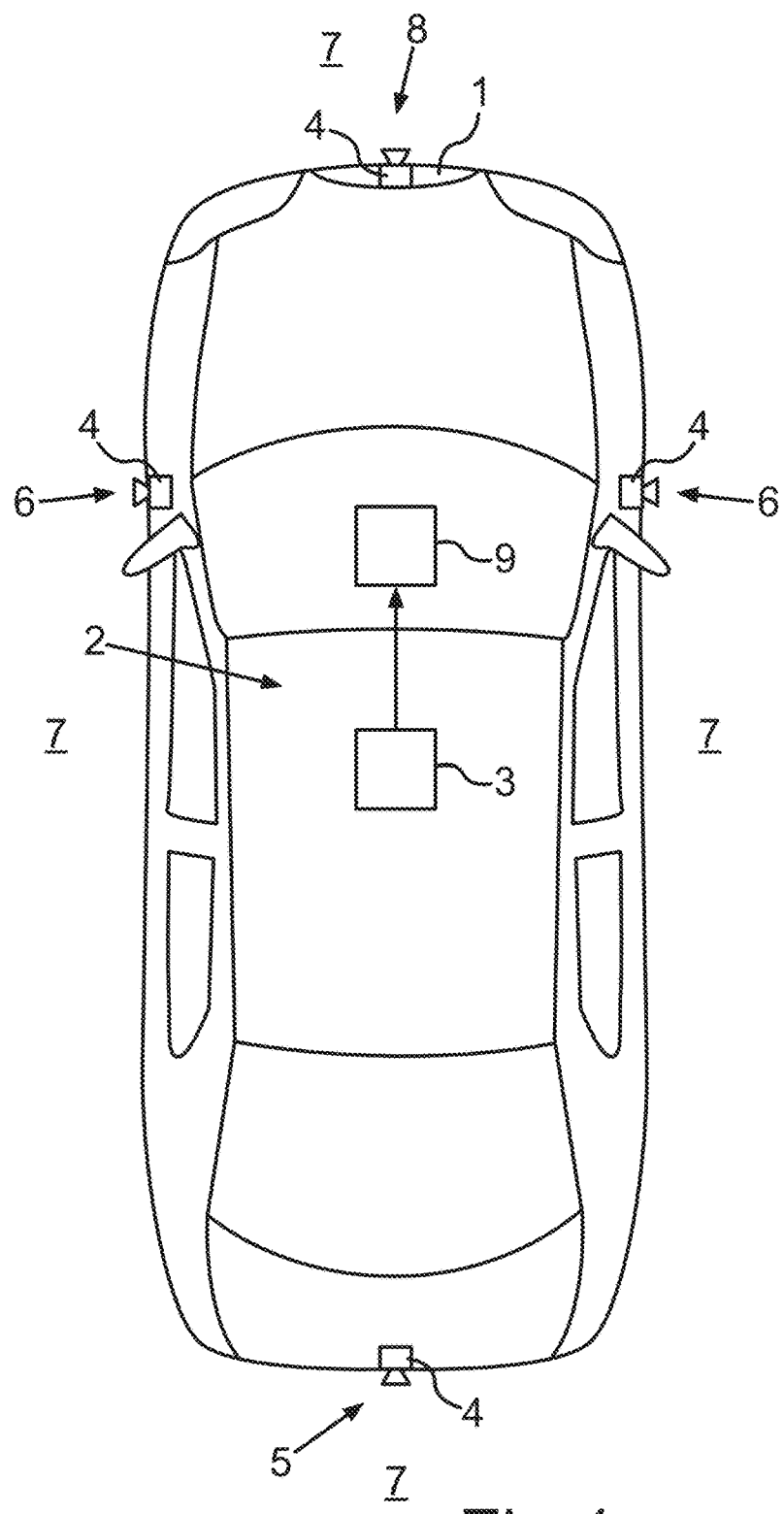

| | | | |
|---|---|---|---|
| 2013/0293771 A1* | 11/2013 | Mori | H04N 5/2252 348/374 |
| 2015/0029337 A1* | 1/2015 | Uchiyama | H04N 5/2252 348/148 |
| 2015/0217694 A1 | 8/2015 | Bingle et al. | |
| 2015/0222795 A1 | 8/2015 | Sauer et al. | |
| 2016/0205294 A1* | 7/2016 | Ahn | H04N 5/2252 348/373 |

FOREIGN PATENT DOCUMENTS

| | | |
|---|---|---|
| EP | 2863623 A1 | 4/2015 |
| WO | 2011/082715 A1 | 7/2011 |
| WO | 2016/087227 A1 | 6/2016 |

OTHER PUBLICATIONS

Written Opinion of the International Searching Authority issued in PCT/EP2016/071333 dated Dec. 19, 2016 (8 pages).
German Search Report issued in DE 10 2015 115 361.0 dated Jun. 30, 2016 (10 pages).

\* cited by examiner

METHOD FOR MANUFACTURING A CAMERA FOR A MOTOR VEHICLE IN DEPENDENCY ON AN INTERFACE DEVICE, CAMERA, AS WELL AS MOTOR VEHICLE

The present invention relates to a method for manufacturing a camera for a motor vehicle, in which method an interface device for connecting the camera with a data bus of the motor vehicle is selected from at least two different interface devices and is arranged on a circuit board, the circuit board is arranged in an interior space of the front housing of the camera, a rear housing is manufactured and connected with the front housing, wherein the rear housing has a through-opening, through which the interface device is passed partly. The invention moreover relates to a camera for a motor vehicle. Finally, the present invention relates to a motor vehicle comprising at least one such camera.

The interest is focused in particular on cameras for motor vehicles. Such cameras can, for example, be part of a driver assistance system of the motor vehicle, by means of which the environmental region of the motor vehicle can be captured. In this connection it can in particular be envisaged that several cameras are disposed distributed on the motor vehicle. The environmental region captured by the cameras or the video data provided by the cameras can be displayed for instance on a corresponding display device to the driver of the motor vehicle. In this way, the driver can be assisted in driving the vehicle.

The cameras comprise a housing arrangement, which commonly is formed from two parts, namely a front housing and a rear housing. The front housing can serve for holding the lens of the camera and therefore can also be referred to as lens housing. In the interior of the front housing at least one circuit board of the camera is arranged. On this circuit board a plurality of electronic components is arranged. Moreover on this circuit board an interface device is arranged, which can be connected with a data bus of the motor vehicle. Via the interface device the video data provided by the camera can for instance be transmitted to the display device. Moreover, the housing device comprises a rear housing, which is connected with the front housing for instance by a screw connection. The rear housing can have a through-opening, through which the interface device is passed. In the case of the cameras, which are employed in the field of motor vehicles, different interface devices are used. This involves a raised manufacturing effort in particular with regard to the rear housing.

It is the task of the present invention to present a solution as how to manufacture a camera for a motor vehicle of the initially mentioned kind in a simpler and more cost-effective way.

This task according to the invention is solved by a method, by a camera, as well as by a motor vehicle with the features according to the respective independent patent claims. Advantageous embodiments of the invention are subject matter of the dependent claims, the description, and the figures.

A method according to the invention serves for manufacturing a camera for a motor vehicle. In this connection an interface device for connecting the camera with a data bus of the motor vehicle is selected from at least two different interface devices and is arranged on a circuit board. Moreover, the circuit board is arranged within an interior of a front housing of the camera. Further, a rear housing is manufactured and connected with the front housing, wherein the rear housing has a through-opening, through which the interface device is passed partly. In this connection in the manufacture of the rear housing the through-opening is formed in dependency on the selected interface device, with an outer contour of the rear housing being maintained.

In the present case a camera for a motor vehicle is to be manufactured. Such a camera for instance can be arranged on the outside of the motor vehicle. The camera then can be part of a driver assistance system of the motor vehicle, wherein by the camera an environmental area of the motor vehicle can be captured. The camera comprises a housing arrangement, which comprises the front housing and the rear housing.

In the interior of the front housing a circuit board is arranged, on which an interface device is arranged. The interface device can be designed as a plug or as a socket and can serve for transmitting the video data captured by the camera to the motor vehicle or to a display device of the motor vehicle. The interface device for instance can be designed as a surface-mountable component. When manufacturing the camera an interface device is selected from at least two different interface devices. Such an interface device for instance can be a RosenbergerHSD High Speed Data Connection or a coaxial plug connection.

When manufacturing the rear housing, for the basic shape or the outer contour of the rear housing a standardized shape design is chosen. The through-opening, through which the interface device is passed, is formed in dependency on the selected interface device in the rear housing. In other words, the rear housings that can be selected for the various interface devices, merely differ in their dimensions and/or the position of the through-opening. Thus, a modular exchangeable rear housing can be provided, which is adapted to the selected interface device. In this way a simple and cost-effective manufacture of the camera is facilitated.

Preferably, the rear housing is manufactured by means of a die-casting method and a tool for the die-casting method is adapted in dependency on the selected interface device. The rear housing for instance can be formed from aluminium or an aluminium alloy. In the die-casting method a liquid melt of the material is pressed under high pressure into a tool or a die-casting mould, where the melt then solidifies. In this connection the tool or the die-casting mould is adapted in such a way that only part of the tool is changed, which is assigned to the manufacture of the through-opening. Thus, for instance only part of the tool can be adapted and thus costs involved in manufacturing can be saved.

In particular for adapting the tool to an insert element of the tool is changed. For manufacturing the rear housing in general a standard tool can be used, by which the outer contour or the outer shape design of the rear housing is provided. In this standard tool an insert element or a slider can be introduced, which provides the shape design for the through-opening. Thus, costs involved in the provision of the tools for manufacture of the various rear housings can be reduced.

In one embodiment during manufacture of the rear housing the through-opening is formed in dependency on dimensions of the selected interface device and/or an arrangement of the selected interface device on the circuit board. The different interface devices can differ in their outer dimensions, for instance in their outer diameter. Moreover, the interface devices can differ in their position on the circuit board. In this connection during manufacture of the rear housing the through-opening is introduced to be suitable for the selected interface device. Thus, the rear housing can be manufactured in dependency on the selected interface device.

In a further embodiment in the manufacture of the rear housing a recess for a plug housing is formed. Around the interface device moreover a plug housing can be arranged. This plug housing for instance can be formed from plastics and can serve for holding a connection line for the data bus of the motor vehicle. In this connection in particular on a side of the rear housing, which faces away from the front housing, a recess is introduced. When manufacturing the rear housing, this recess can be always of the same design. Thus a standardized recess for a plug housing can be provided.

The interest is focused in particular on cameras for motor vehicles. Such cameras for instance can form part of a driver assistance system of the motor vehicle, by which the environmental area of the motor vehicle can be captured. In this connection it can in particular be envisaged that several cameras are arranged to be distributed on the motor vehicle. The environmental area captured by the cameras or the video data provided by the cameras can be displayed to the driver of the motor vehicle for instance on a corresponding display device. In this way the driver can be supported in driving the motor vehicle.

In a further embodiment, when manufacturing the rear housing, at least one bore is formed, wherein in the process of connecting the rear housing with the front housing a connection element is passed through the bore. In the front housing for instance a corresponding thread can be arranged, which is arranged to align with the bore in the rear housing. Thus, as connecting element for instance a screw can be passed through the bore and be introduced into the thread of the front housing. Here, too, it is in particular envisaged that the bore for all rear housings regardless of the selected plug type is of the same design.

According to the invention, a camera for a motor vehicle comprises an interface device for connecting the camera with a data bus of the motor vehicle, wherein the interface device is selected from at least two different interface devices. Moreover, the camera comprises a circuit board, on which the interface device is arranged. Further, the camera comprises a front housing, the interior of which is arranged on a circuit board. Moreover, the camera comprises a rear housing, which is connected with the front housing, wherein the rear housing has a through-opening, through which the interface device is partly passed. In this connection in the rear housing the through-opening is formed in dependency on the selected interface device, with an outer contour of the rear housing being maintained in manufacture. This means that the camera according to the invention can be manufactured according to a method according to the invention. The camera can have a motor vehicle fastening device for fastening the camera to the motor vehicle.

A motor vehicle according to the invention comprises at least one camera according to the invention. In this connection it can also be envisaged that several cameras are arranged to be distributed on the motor vehicle. The cameras can for instance be part of a driver assistance system of the motor vehicle. In this connection the at least one camera serves for providing video data, which describe the environmental area of the motor vehicle. These video data can for instance be displayed on a display device of the motor vehicle. The at least one camera can accordingly be used for supporting the driver in parking or backing into a parking space. If several cameras are arranged on the motor vehicle, by these the environmental area of the motor vehicle can be represented. The cameras can be part of the so-called electronic rear view mirror.

The preferred embodiments presented with regard to the method according to the invention and their advantages in analogy apply to the camera according to the invention as well as to the motor vehicle according to the invention.

Further features of the invention may be gathered from the claims, the figures, and the description of the figures. The features and feature combinations mentioned above in the description as well as the features and feature combinations mentioned below in the description of the figures and/or shown in the figures alone can be used not only in the respectively specified combination, but also in other combinations or alone, without departing from the scope of the invention. Thus, also embodiments are to be considered as comprised and disclosed by the invention that are not explicitly shown in the figures and explained, but derive from and can be generated by separated feature combinations from the explained embodiments. Also embodiments and feature combinations are to be considered as disclosed, which thus do not have all of the features of an originally formulated independent claim.

With the indications "top", "bottom", "front", "rear", "horizontal", "vertical", depth direction", "width direction", "height direction" etc. the positions and orientations given with intended use and intended arrangement of the camera on the motor vehicle and with an observer then standing in front of the camera and looking in the direction of the camera are specified.

The invention is now explained in more detail with reference to preferred embodiments as well as to the attached drawings.

Figure 2:
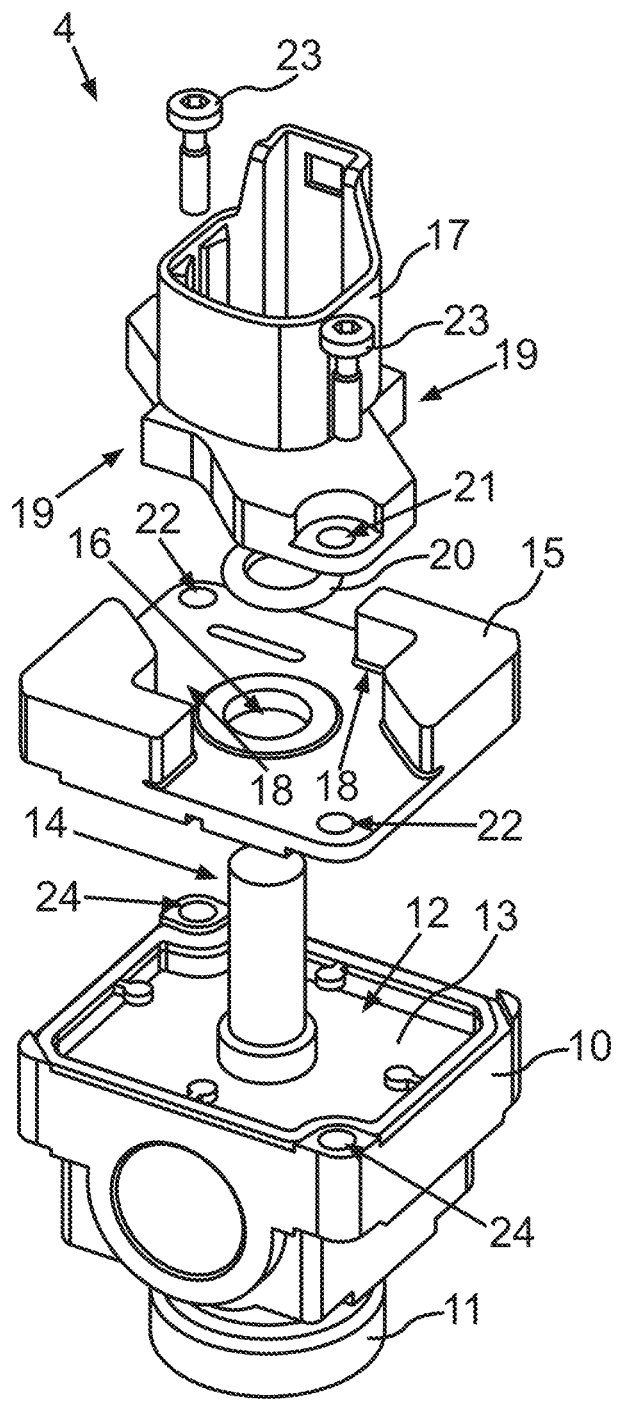
Figure 3:
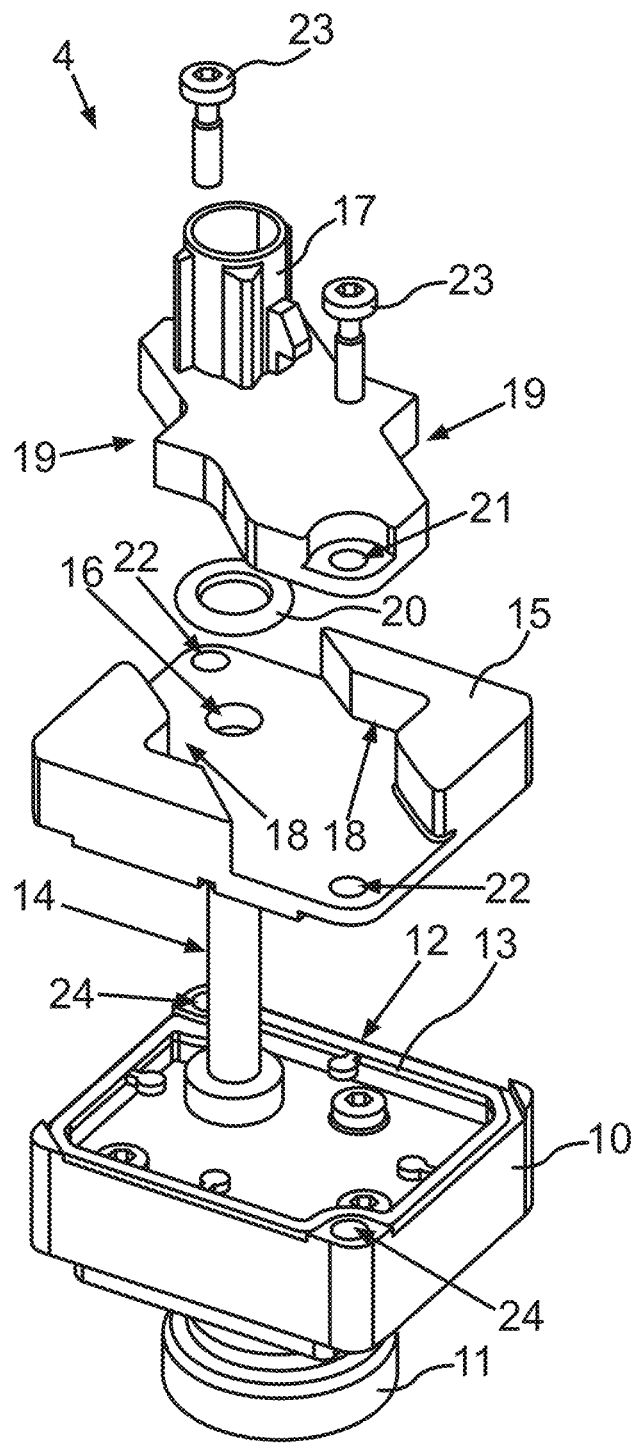
Figure 4:
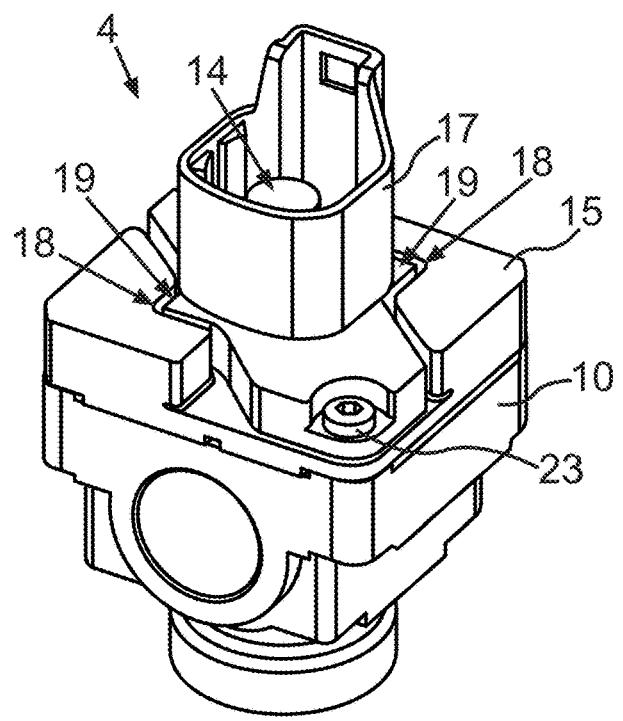

Therein show:

FIG. 1 a motor vehicle according to an embodiment of the present invention, which shows a driver assistance system comprising four cameras;

FIG. 2 a camera according to a first embodiment in an exploded view;

FIG. 3 a camera according to a second embodiment in an exploded view;

FIG. 4 the camera according to FIG. 2 in a perspective view; and

Figure 5:
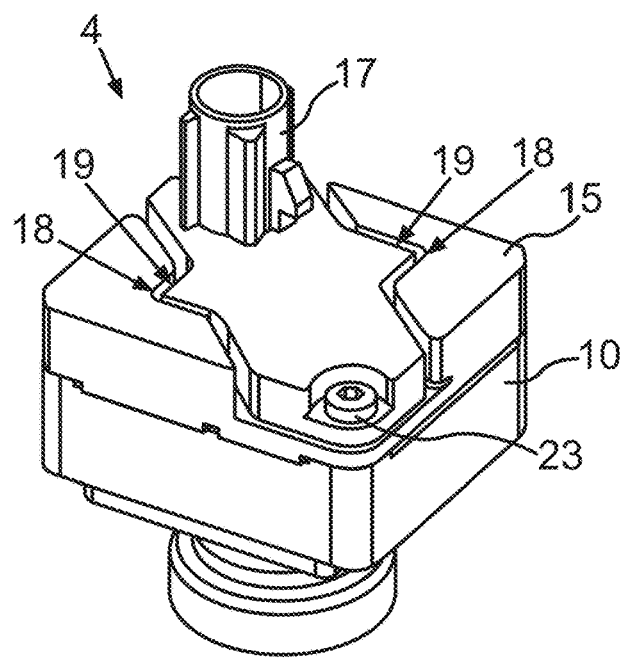

FIG. 5 the camera according to FIG. 3 in a perspective view.

In the figures, same elements and elements having the same function are equipped with the same reference signs.

FIG. 1 is a top view of a motor vehicle 1 according to an embodiment of the present invention. The motor vehicle 1 in the present case is designed as a passenger vehicle. The motor vehicle 1 includes a driver assistance system 2. The driver assistance system 2 in turn comprises a control device 3, which can be formed for example by an electronic control unit of the motor vehicle 1. Furthermore, the driver assistance system 2 comprises at least one camera 4. In the present embodiment the driver assistance system 2 comprises four cameras 4, which are disposed distributed on the motor vehicle 1. In the present case, one of the cameras 4 is arranged in a rear area 5 of the motor vehicle 1 and one of the cameras 4 is arranged in a front area 8 of the motor vehicle 1. The remaining cameras 4 are arranged in a respective lateral area 6, in particular in the area of the side-view mirrors. The number and arrangement of the cameras 4 of the driver assistance system 2 in the present case is to be taken as merely exemplary.

By the cameras 4 an environmental area 7 of the motor vehicle 1 can be captured. The four cameras 4 are preferably of an identical construction design. In particular an image sequence or video data describing the environmental area 7 can be provided by the cameras 4. These video data can be transmitted by cameras 4 to the control device 3. By the control device 3 a display device 9 of the motor vehicle 1 can be controlled so that the video data of the cameras 4 can be displayed to the driver. The driver assistance system 2 thus serves for assisting the driver of the motor vehicle 1 in driving the motor vehicle 1.

FIG. 2 shows a camera 4 according to a first embodiment in a perspective view. The camera 4 comprises a front housing 10, which for instance is manufactured by a die-casting method from aluminium or an aluminium alloy. The front housing 10 serves for holding a lens 11 of the camera 4. Moreover, in an interior 12 of the front housing 10 a circuit board 13 is arranged. On this circuit board 13 a plurality of electronic components can be arranged. Moreover, on the circuit board 13 an interface device 14 is arranged, which can be connected with a vehicle bus of the motor vehicle 1. In the present embodiment the interface device 14 is in the form of a so-called RosenbergerHSD interface.

Moreover, the camera 4 comprises a rear housing 15 or a rear plate. The rear housing 15 is equally manufactured from aluminium or an aluminium alloy by a die-casting method. The rear housing 15 has a through-opening 16, through which the interface device 14 is passed. Besides, the camera 4 has a plug housing 17, which in the mounted state of the camera 4 surrounds the interface device 14. On the rear housing 15 corresponding recesses 18 are envisaged, which can be introduced into corresponding elevations 19 of the plug housing 17. In addition, between the plug housing 17 and the rear housing 15 a sealing element 20 in the form of an O-ring is arranged. The plug housing 17 comprises corresponding bores 21. Moreover, the rear housing 15 comprises bores 22. Through the bores 21 of the plug housing 17 and through the bores 22 of the rear housing 15 corresponding fastening elements 23 in the form of screws can be passed and be screwed into respective threads 24 of the front housing 10.

FIG. 3 shows a camera 4 according to a further embodiment. The camera 4 differs from the camera 4 according to FIG. 2 by the interface device 14. In the present case this is configured as coaxial plug connector. The interface device 14 differs by the outer dimensions and the arrangement on the circuit board 13. Further, the cameras 4 according to the FIGS. 2 and 3 differ in the design of the plug housing 17.

For the manufacture of the rear housing 15 now a standardized basic shape is used. In this standardized basic shape the outer contour is the same for all rear housings 15 irrespective of the selected interface device 14. This means that all rear housings 15 basically have the same shape. All rear housings 15 comprise the recesses 18 for the corresponding elevations 19 of the plug housing 17. Moreover, the bores 22 are the same in all rear housings 15. The manufacture process is adapted merely with regard to the through-opening 16. In this connection the die-casting method can be correspondingly modified. In particular an insert element in the tool can be adapted for the selected interface device 14. Thus, a fast and cost-effective manufacture of the rear housing 15 can be facilitated.

FIG. 4 shows the camera 4 according to FIG. 2 in the mounted state in a perspective view. Further, FIG. 5 shows the camera 4 according to FIG. 3 in the mounted state in a perspective view. In the present case it can be discerned that the plug housings 17 differ from each other. But they have equally configured elevations 19, which are introduced into the corresponding recesses 18 of the rear housing 15.

The invention claimed is:

1. A method for manufacturing a camera for a motor vehicle, the method comprising:
    selecting an interface device from at least two different interface devices to obtain a selected interface device;
    connecting the camera with a data bus of the motor vehicle in the selected interface device;
    connecting the selected interface device to a circuit board, wherein the circuit board is arranged in an interior space of a front housing of the camera; and
    manufacturing a rear housing of the camera and connecting the rear housing with the front housing of the camera,
    wherein the rear housing has a through-opening, through which the interface device is passed partly, and
    wherein in manufacture of the rear housing the through-opening is formed based on the selected interface device while an outer contour of the rear housing is maintained and a recess for a separate plug housing is formed.

2. The method according to claim 1, wherein the rear housing is manufactured by a die-casting method and a tool for the die-casting method is adapted based on the selected interface device.

3. The method according to claim 2, wherein for adapting the tool an insert element of the tool is changed.

4. The method according to claim 1, wherein in the manufacture of the rear housing the through-opening is formed based on dimensions of the selected interface device and/or an arrangement of the selected interface device on the circuit board.

5. The method according to claim 1, wherein the plug housing is provided, which has an elevation corresponding to the recess.

6. The method according to claim 5, wherein between the rear housing and the plug housing a sealing element is arranged.

7. The method according to claim 5, wherein between the rear housing and the plug housing a sealing element is arranged.

8. The method according to claim 1, wherein in the manufacture of the rear housing at least one bore is formed, wherein, when connecting the rear housing with the front housing, a connection element is passed through the bore.

9. A camera for a motor vehicle, the camera comprising:
    an interface device for connecting the camera with a data bus of the motor vehicle, wherein the interface device is selected from at least two different interface devices;
    a circuit board, to which the selected interface device is connected;
    a front housing, in an interior of which the circuit board is arranged; and
    a rear housing, which is connected with the front housing, wherein the rear housing has a through-opening, through which the interface device is partly passed, wherein in the rear housing the through-opening is formed based on the selected interface device, wherein an outer contour of the rear housing is maintained in manufacture and the rear housing comprises a recess for a plug housing.

10. A motor vehicle comprising at least one camera according to claim 8 mounted to an exterior of the motor vehicle.

* * * * *